(12) United States Patent
Kurian et al.

(10) Patent No.: US 12,406,069 B2
(45) Date of Patent: Sep. 2, 2025

(54) SYSTEM FOR REMEDIATION OF SECURITY VULNERABILITIES IN COMPUTING DEVICES USING CONTINUOUS DEVICE-LEVEL SCANNING AND MONITORING

(71) Applicant: BANK OF AMERICA CORPORATION, Charlotte, NC (US)

(72) Inventors: Manu Jacob Kurian, Dallas, TX (US); Joel Townsend, Spring Church, PA (US); Tomas M. Castrejon, III, Fort Mill, SC (US); Michael Robert Young, Davidson, NC (US); David Nardoni, Sierra Madre, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 583 days.

(21) Appl. No.: 17/734,260

(22) Filed: May 2, 2022

(65) Prior Publication Data
US 2023/0351023 A1    Nov. 2, 2023

(51) Int. Cl.
*G06F 21/57* (2013.01)
*G06F 21/55* (2013.01)
*G06N 20/00* (2019.01)

(52) U.S. Cl.
CPC .......... *G06F 21/577* (2013.01); *G06F 21/552* (2013.01); *G06F 21/554* (2013.01); *G06N 20/00* (2019.01)

(58) Field of Classification Search
CPC .... G06F 21/577; G06F 21/552; G06F 21/554; G06N 20/00
See application file for complete search history.

(56) References Cited

U.S. PATENT DOCUMENTS

| | | | |
|---|---|---|---|
| 8,621,211 B1 * | 12/2013 | Kishore | H04L 41/0806 713/168 |
| 9,378,359 B2 | 6/2016 | Qureshi et al. | |
| 9,432,361 B2 | 8/2016 | Mahaffey et al. | |
| 9,860,129 B2 | 1/2018 | Zinger et al. | |
| 9,923,918 B2 | 3/2018 | Nicodemus et al. | |
| 10,387,689 B2 | 8/2019 | Krawczewicz et al. | |

(Continued)

FOREIGN PATENT DOCUMENTS

WO    WO-2018130904 A1 * 12/2017 ............. G06F 21/54

*Primary Examiner* — Huan V Doan
(74) *Attorney, Agent, or Firm* — Moore & Van Allen PLLC; Nicholas C. Russell

(57) ABSTRACT

A system is provided for remediation of security vulnerabilities in computing devices using continuous device-level scanning and monitoring. In particular, the system may perform a deep scan of the hardware and software elements of a computing device and/or application and compile the information from the deep scan into a hardware metadata list and a software metadata list associated with the computing device and/or application. The system may then, through a machine learning-based process, continuously scan the elements within the hardware metadata list and the software metadata list to identify the elements that are not involved in the operation of the computing device and/or application. The system may flag such elements for inspection to evaluate the safety of the elements and subsequently execute one or more remediation processes in response to detecting an unsafe element.

20 Claims, 2 Drawing Sheets

(56) References Cited

U.S. PATENT DOCUMENTS

| | | | |
|---|---|---|---|
| 10,740,469 | B2 | 8/2020 | Zheng et al. |
| 10,778,659 | B2 | 9/2020 | Tola et al. |
| 10,904,268 | B2 | 1/2021 | Brandwine et al. |
| 11,068,389 | B2 | 7/2021 | Gao et al. |
| 11,157,300 | B2 | 10/2021 | Thomas et al. |
| 2017/0091461 | A1* | 3/2017 | Tin ................ G06F 21/53 |
| 2017/0310692 | A1 | 10/2017 | Ackerman et al. |
| 2017/0353491 | A1 | 12/2017 | Gukal et al. |
| 2018/0295154 | A1 | 10/2018 | Crabtree et al. |
| 2019/0065970 | A1 | 2/2019 | Bonutti et al. |
| 2019/0268302 | A1 | 8/2019 | McDonald |
| 2019/0342324 | A1* | 11/2019 | Nawy ............... G06F 16/2228 |
| 2020/0025629 | A1 | 1/2020 | Zinger et al. |
| 2020/0351657 | A1 | 11/2020 | Wentz |
| 2021/0258304 | A1 | 8/2021 | Cockerill et al. |
| 2021/0279320 | A1 | 9/2021 | Robinson et al. |
| 2021/0344707 | A1 | 11/2021 | Ackerman et al. |
| 2022/0263854 | A1* | 8/2022 | Miller ............... H04L 63/1433 |

* cited by examiner

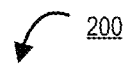

```
┌─────────────────────────────────────────────────────────────┐
│ GENERATE A SOFTWARE METADATA LIST AND A HARDWARE METADATA LIST│
│         FOR AN ENDPOINT DEVICE WITHIN A NETWORK              │
│                            201                               │
└─────────────────────────────────────────────────────────────┘
                              │
                              ▼
┌─────────────────────────────────────────────────────────────┐
│ CONTINUOUSLY MONITOR COMPONENTS WITHIN THE ENDPOINT DEVICE BASED│
│    ON THE SOFTWARE METADATA LIST AND THE HARDWARE METADATA LIST│
│                            202                               │
└─────────────────────────────────────────────────────────────┘
                              │
                              ▼
┌─────────────────────────────────────────────────────────────┐
│ DETECT A NEW COMPONENT WITHIN THE ENDPOINT DEVICE THAT DOES NOT│
│   APPEAR IN THE SOFTWARE METADATA LIST OR THE HARDWARE METADATA│
│                            LIST                              │
│                            203                               │
└─────────────────────────────────────────────────────────────┘
                              │
                              ▼
┌─────────────────────────────────────────────────────────────┐
│  ANALYZE, USING A MACHINE LEARNING ALGORITHM, OPERATIONAL BEHAVIOR│
│                    OF THE NEW COMPONENT                      │
│                            204                               │
└─────────────────────────────────────────────────────────────┘
                              │
                              ▼
┌─────────────────────────────────────────────────────────────┐
│     BASED ON THE OPERATIONAL BEHAVIOR OF THE NEW COMPONENT,  │
│      DETERMINE A LEVEL OF SECURITY OF THE NEW COMPONENT      │
│                            205                               │
└─────────────────────────────────────────────────────────────┘
```

FIG. 2

SYSTEM FOR REMEDIATION OF SECURITY VULNERABILITIES IN COMPUTING DEVICES USING CONTINUOUS DEVICE-LEVEL SCANNING AND MONITORING

FIELD OF THE INVENTION

The present disclosure embraces a system for remediation of security vulnerabilities in computing devices using continuous device-level scanning and monitoring.

BACKGROUND

There is a need for an effective way to address security vulnerabilities in hardware devices and software applications.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for remediation of security vulnerabilities in computing devices using continuous device-level scanning and monitoring. In particular, the system may perform a deep scan of the hardware and software elements of a computing device and/or application and compile the information from the deep scan into a hardware metadata list and a software metadata list associated with the computing device and/or application. The system may then, through a machine learning-based process, continuously scan the elements within the hardware metadata list and the software metadata list to identify the elements that are not involved in the operation of the computing device and/or application. The system may flag such elements for inspection to evaluate the safety of the elements and subsequently execute one or more remediation processes in response to detecting an unsafe element. In this way, the system may enhance the security of the computing devices and/or applications operating within the network.

Accordingly, embodiments of the present disclosure provide a system for remediation of security vulnerabilities in computing devices using continuous device-level scanning and monitoring, the system comprising a memory device with computer-readable program code stored thereon; a communication device; and a processing device operatively coupled to the memory device and the communication device, wherein the processing device is configured to execute the computer-readable program code to generate a software metadata list and a hardware metadata list for an endpoint device within a network; continuously monitor components within the endpoint device based on the software metadata list and the hardware metadata list; detect a new component within the endpoint device that does not appear in the software metadata list or the hardware metadata list; analyze, using a machine learning algorithm, operational behavior of the new component; and based on the operational behavior of the new component, determine a level of security of the new component.

In some embodiments, the processing device is further configured to execute the computer-readable program code to detect, based on the level of security of the new component, a security issue associated with the new component; and initiate one or more remediation processes to address the security issue.

In some embodiments, the one or more remediation processes comprises at least one of isolating the new component, deleting the new component, and performing network segmentation of the endpoint device.

In some embodiments, the processing device is further configured to execute the computer-readable program code to detect, based on the level of security of the new component, that the new component is safe; and add an entry for the new component in the software metadata list or the hardware metadata list.

In some embodiments, the software metadata list comprises a list of authorized drivers, applications, and libraries associated with the endpoint device.

In some embodiments, the hardware metadata list comprises a list of authorized processing units, storage devices, networking devices, and mainboards associated with the endpoint device.

In some embodiments, analyzing the operational behavior of the new component comprises at least one of detecting access permissions, monitoring data sent and received by the new component, and detecting file access on the endpoint device.

Embodiments of the present disclosure also provide a computer program product for remediation of security vulnerabilities in computing devices using continuous device-level scanning and monitoring, the computer program product comprising at least one non-transitory computer readable medium having computer-readable program code portions embodied therein, the computer-readable program code portions comprising executable portions for generating a software metadata list and a hardware metadata list for an endpoint device within a network; continuously monitoring components within the endpoint device based on the software metadata list and the hardware metadata list; detecting a new component within the endpoint device that does not appear in the software metadata list or the hardware metadata list; analyzing, using a machine learning algorithm, operational behavior of the new component; and based on the operational behavior of the new component, determining a level of security of the new component.

In some embodiments, the computer-readable program code portions further comprise executable portions for detecting, based on the level of security of the new component, a security issue associated with the new component; and initiating one or more remediation processes to address the security issue.

In some embodiments, the one or more remediation processes comprises at least one of isolating the new component, deleting the new component, and performing network segmentation of the endpoint device.

In some embodiments, the computer-readable program code portions further comprise executable portions for detecting, based on the level of security of the new component, that the new component is safe; and adding an entry for the new component in the software metadata list or the hardware metadata list.

In some embodiments, the software metadata list comprises a list of authorized drivers, applications, and libraries associated with the endpoint device.

In some embodiments, the hardware metadata list comprises a list of authorized processing units, storage devices, networking devices, and mainboards associated with the endpoint device.

Embodiments of the present disclosure also provide a computer-implemented method for remediation of security vulnerabilities in computing devices using continuous device-level scanning and monitoring, the computer-implemented method comprising generating a software metadata list and a hardware metadata list for an endpoint device within a network; continuously monitoring components within the endpoint device based on the software metadata list and the hardware metadata list; detecting a new component within the endpoint device that does not appear in the software metadata list or the hardware metadata list; analyzing, using a machine learning algorithm, operational behavior of the new component; and based on the operational behavior of the new component, determining a level of security of the new component.

In some embodiments, the computer-implemented method further comprises detecting, based on the level of security of the new component, a security issue associated with the new component; and initiating one or more remediation processes to address the security issue.

In some embodiments, the one or more remediation processes comprises at least one of isolating the new component, deleting the new component, and performing network segmentation of the endpoint device.

In some embodiments, the computer-implemented method further comprises detecting, based on the level of security of the new component, that the new component is safe; and adding an entry for the new component in the software metadata list or the hardware metadata list.

In some embodiments, the software metadata list comprises a list of authorized drivers, applications, and libraries associated with the endpoint device.

In some embodiments, the hardware metadata list comprises a list of authorized processing units, storage devices, networking devices, and mainboards associated with the endpoint device.

In some embodiments, analyzing the operational behavior of the new component comprises at least one of detecting access permissions, monitoring data sent and received by the new component, and detecting file access on the endpoint device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
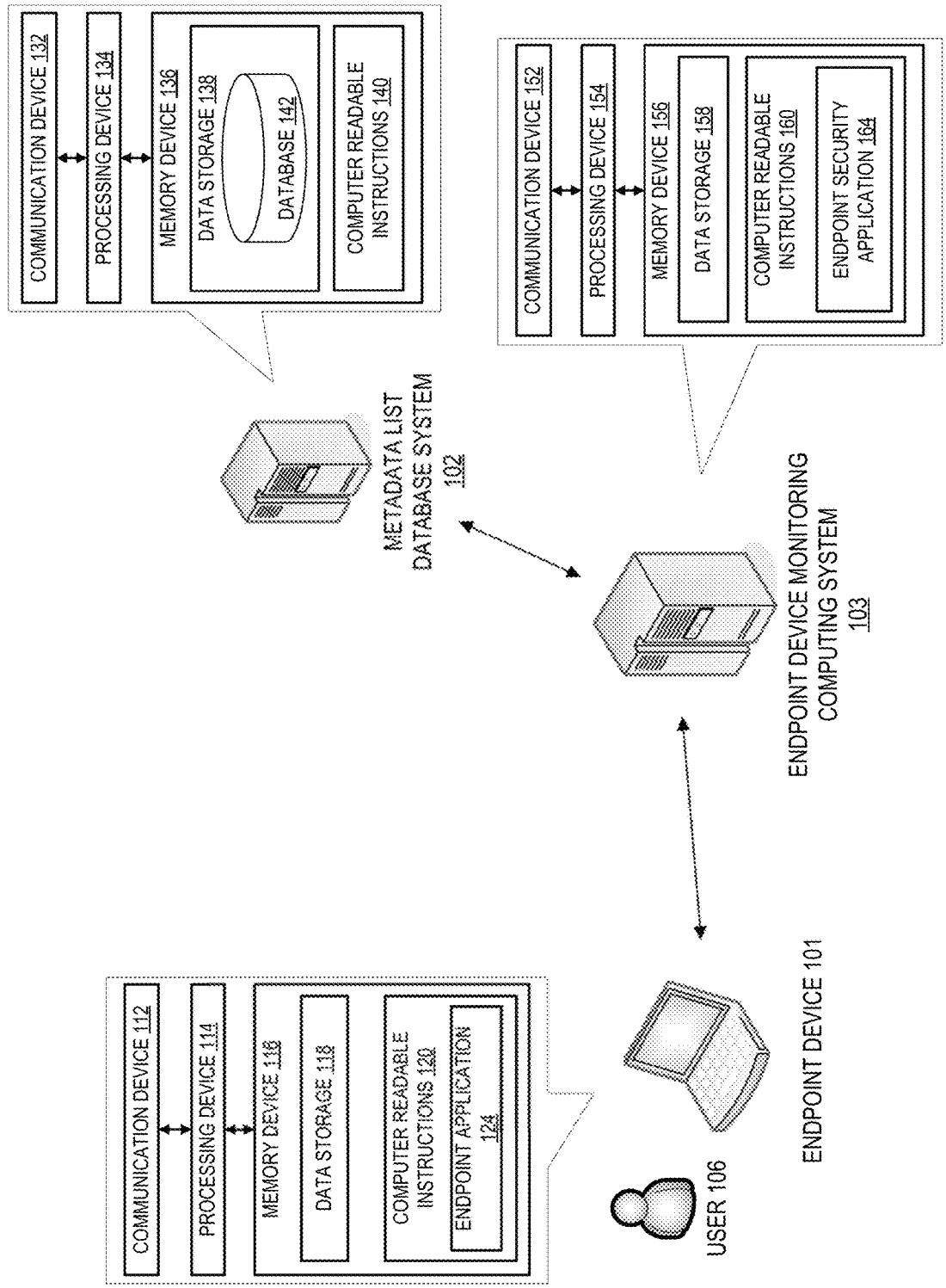

Having thus described embodiments of the invention in general terms, reference will now be made to the accompanying drawings, wherein:

FIG. 1 illustrates an operating environment for the computing element security management system, in accordance with one embodiment of the present disclosure;

FIG. 2 is a flow diagram illustrating a process for remediation of security vulnerabilities in computing devices using continuous device-level scanning and monitoring, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, "user" as used herein may refer to a computerized resource (e.g., a computing system, application, system process, or the like) that may access other resources as part of its operations.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to tangible or intangible objects which may be held, owned, or used by a user and/or the entity. In particular, "resource" as used herein may refer to computing resources such as hardware (e.g., computing systems, hardware components, servers, wireless smart devices, IoT devices, or the like) and/or software (e.g., applications, operating systems, data repositories, or the like).

"Endpoint device" as used herein generally refers to a computing device or electronic device that is connected to a network (e.g., the entity's network).

"Software metadata list" or "software bill of materials" (which may also be referred to herein as "SBOM") as used herein may refer to a data file comprising an inventory of software components associated with a computing device and/or application, where said software components may include drivers, software libraries, executable binaries, and/or the like.

"Hardware metadata list" or "infrastructure bill of materials" (which may also be referred to herein as "MOM") as used herein may refer to a data file comprising an inventory of hardware components associated with a computing device and/or application, where said hardware components may comprise a central processing unit, memory, disk drives, mainboards, add-in or expansion boards, networking or other peripherals, and/or the like.

An entity's network environment may include a number of endpoint devices that the entity may wish to protect from unauthorized use or damage (e.g., execution of unsafe code, leakage of sensitive data, or the like). In this regard, the system may perform a deep scan of the software and hardware components of each endpoint device within the network. Based on the deep scan, the system may generate a software metadata list and a hardware metadata list for each of the endpoint devices. For instance, the system may generate the software metadata list based on the various software components of applications that may be installed and/or running on the endpoint device (e.g., drivers, libraries, executables, and the like). Accordingly, in some embodiments, the system may generate a separate software metadata list for each application installed on the endpoint device. Similarly, the hardware metadata list may be generated based on the hardware components that are installed in or otherwise a part of the endpoint device (e.g., processing unit, disk drives, memory, network interface card, or the like).

As time passes, the various endpoint devices may undergo changes to the configuration of hardware and/or software components installed therein. For example, new or upgraded hardware components may be installed (e.g., a new mainboard or network peripheral) while legacy components may be removed (e.g., serial communication cards). Furthermore, new applications may be installed and system upgrades may be performed, while legacy applications and/or drivers may be uninstalled from the endpoint device. In such scenarios, the hardware and software configuration of the endpoint device may differ from what is indicated on the initial hardware metadata list and/or software metadata list.

Accordingly, the system may use a machine learning model to continuously monitor and analyze the operational aspects of the hardware and software components listed in the hardware metadata list and software metadata list, as well as any new components that are not listed on the hardware metadata list or software metadata list, for each endpoint device in the network. For each detected component, the system may use the machine learning model to determine whether the component is related to the operation of the applications and/or devices listed in the SBOM and/or IBOM associated with the endpoint device. If the component is determined to be unrelated to the operation of the endpoint device and any of the hardware and/or software components therein, the system may flag the component as being potentially unsafe. In this regard, the system may generate a report comprising a list of flagged components. In some embodiments, a user such as an employee or administrator of the entity may assess the component and provide an input (e.g., through a graphical interface of an endpoint device management application) regarding the safety of the flagged components. In other embodiments, the system may use a machine learning process to analyze the behavior of the component (e.g., which functions are called, which parts of memory are accessed, what data is transmitted to and from the component over the network, and the like) to automatically make a determination as to whether the component is safe or unsafe.

If the component is determined to be unsafe or unauthorized, the system may automatically execute one or more remediation processes to protect the endpoint device as well as the components therein. Examples of such remediation processes may include network segmentation and/or isolation of the affected endpoint device or component, secure wiping of sensitive data within the endpoint device, restoration of the endpoint device to standard or original settings (e.g., resetting the endpoint device based on the SBOM and IBOM), and the like.

If the component is determined to be safe or authorized, the system may update the IBOM and/or SBOM by automatically adding the component to the IBOM and/or SBOM associated with the endpoint device. In this way, the system may maintain an updated device-level inventory of safe and/or approved hardware and/or software components for each endpoint device within the network, thereby ensuring the safety and security of the endpoint devices as well as the data stored across the enterprise network environment.

A number of exemplary use cases are provided below. It should be understood that the following use cases are described for illustrative purposes and should not be construed as restricting or limiting the scope of the disclosure provided herein. In one embodiment, the system may detect a new hardware device within an endpoint device (e.g., a detachable USB storage device connected to the endpoint device) by detecting that the USB storage device does not appear in the IBOM generated by the system for the endpoint device. The system may further detect that a new software component running on the endpoint device (e.g., a binary executable stored on and running from the USB storage device) by detecting that the executable does not appear in the SBOM associated with the endpoint device. Subsequently, the system may use a machine learning process to monitor and analyze the USB storage device and the binary executable. In some embodiments, the system may automatically pause the operation of the new components (e.g., by restricting access to data files, memory, and the like) while the components are being analyzed.

The machine learning process may be used to examine the behavior and/or operations of the new components. For instance, the system may detect that the USB storage device does not store any of the data files used by the applications or other software components listed in the SBOM. Furthermore, the system may detect that the binary executable is not called by the applications within the SBOM or is not otherwise involved in the operation of the approved applications in the SBOM. Based on the above determinations, the system may flag the USB storage device and the binary executable as potentially unsafe components. The system may then perform a deep analysis of the operations flagged components to determine the safety of the components (e.g., using machine-learning based heuristics). For instance, the system may determine that the USB storage device is connected with read/write access and is configured to execute code with elevated user privileges, and that the binary executable has been loaded into memory with administrator-level privileges and is reading and/or modifying key system files. Accordingly, the system may determine that the USB storage device and binary executable are unsafe. Based on this determination, the system may perform remediation steps to address the security issues found by the system. For example, the system may automatically restrict system-level access to the USB storage device and/or prevent the data stored within the USB storage device from being accessed by the endpoint device. Alternatively or in addition to the above, the system may further automatically isolate and/or wipe the binary executable from the memory of the endpoint device.

In another embodiment, the system may detect that a new software component has been installed on the endpoint device (e.g., a software library). Based on detecting that the software library does not appear in the SBOM, the system may flag the software library for further analysis. That said, the system may determine that the software library is called by a plugin associated with an application that appears in the SBOM of the endpoint device. Accordingly, the system may determine that the software library is related to the operation of an approved application on the endpoint device and subsequently update the SBOM to include an entry relating to the software library. In this way, the system may mark the software library as being safe and/or approved.

The system as described herein confers a number of technological advantages over conventional device security systems. For instance, by generating and maintaining MOM's and SBOM's for each endpoint device, the system may maintain control over the execution of unapproved code and/or addition of unapproved hardware to endpoint devices. Furthermore, by using an intelligent machine learning based process to continuously monitor new components, the system may be able to mitigate security issues while simultaneously accounting for the changes that may occur in the configuration of endpoint devices over time.

Turning now to the figures, FIG. 1 illustrates an operating environment 100 for the computing element security management system, in accordance with one embodiment of the present disclosure. In particular, FIG. 1 illustrates an endpoint device monitoring computing system 103 in operative communication with an endpoint device 101 and metadata list database system 102 over a network. In such a configuration, the endpoint device monitoring computing system 103 may transmit data to and receive data from computing systems over the network, including the endpoint device 101 and/or the metadata list database system 102.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts a single metadata list database system 102, the operating environment may comprise multiple networked databases that may be used to store data regarding the configuration of endpoint devices. It should also be appreciated that one or more functions of the systems, devices, or servers as depicted in FIG. 1 may be combined into a single system, device, or server and/or performed by other computing systems. For instance, though the endpoint device monitoring computing system 103 and the metadata list database system 102 are depicted as separate systems, the functions of both systems may in some embodiments be combined into a single computing system. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the endpoint device monitoring computing system 103 may be a computing system that manages the security of endpoint devices within the network. Accordingly, the endpoint device monitoring computing system 103 may comprise a processing device 154 operatively coupled to a communication device 152 and a memory device 156. The memory device 156 may comprise data storage 158 and computer readable instructions 160 stored thereon, where the computer readable instructions 160 may comprise an endpoint security application 164. The endpoint security application 164 may, when executed by the processor 154 of the endpoint device monitoring computing system 103, cause the processor 154 to perform certain functions of the system, including generation of SBOM's and IBOM's for each endpoint device, continuous monitoring of the configuration of endpoint devices, intelligent heuristic analysis of the operations of the components of endpoint devices, modification of SBOM's and IBOM's, execution of remediation processes to address security issues, and the like.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As further illustrated in FIG. 1, the endpoint device 101 may be in operative communication with the metadata list database system 102 and/or the endpoint device monitoring computing system 103. The endpoint device 101 may be a computing system operated by a user 106, where the user may be an individual who is associated with the entity (e.g., an authorized user on the entity's network such as an agent, employee, or customer of the entity). Accordingly, the endpoint device 101 may be a device that is monitored by the endpoint device monitoring computing system.

The user 106 may, using the endpoint device 101, receive and/or transmit various types of network communications with the various computing systems in the network environment. Accordingly, the endpoint device 101 may comprise a communication device 112, a processing device 114, and a memory device 116. In some embodiments, the endpoint device 101 may comprise hardware and/or software components that allow the endpoint device 101 to interface with the user 106. In such embodiments, the endpoint device 101 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the endpoint device 101 may further comprise data storage 118 and computer-readable instructions 120 stored thereon. The computer-readable instructions 120 of the endpoint device 101 may comprise a user application 124. The user application 124 may be a software application that the user 106 may use to access and view the reports generated by the endpoint device monitoring computing system 103 and provide inputs regarding the safety of certain components in endpoint devices (which may include the endpoint device 101). Accordingly, in some embodiments, the user application 124 may be an application provided by the entity. In other embodiments, the user application 124 may be a third party application such as a web browser configured to access a web server hosted on the endpoint device monitoring computing system 103.

As further illustrated in FIG. 1, the metadata list database system 102 may be a computing system that stores the SBOM's and IBOM's associated with the various endpoint devices within the network. Accordingly, the metadata list database system 102 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 comprises computer-readable instructions 140 and data storage 138. The data storage 138 of the metadata list database system 102 may comprise a database 142, where the database 142 stores the SBOM's and IBOM's associated with each endpoint device within the network. As new components are added to SBOM's and IBOM's over time by the endpoint device monitoring computing system 103, the updated SBOM's and/or IBOM's may be stored within the database 142.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

FIG. 2 is a flow diagram illustrating a process flow 200 for remediation of security vulnerabilities in computing devices using continuous device-level scanning and monitoring. The process begins at block 201, where the system generates a software metadata list and a hardware metadata list for an endpoint device within a network. The software metadata list may include an inventory of software-related components installed within the endpoint device, such as drivers, binary executables, libraries, and the like associated with the installed applications and/or operating system related components within the endpoint device. Similarly, the hardware metadata list may include an inventory of hardware-related components installed within the endpoint device, such as processing units, expansion cards, detachable devices or peripherals, networking devices, and the like. The listed components within the software metadata list and the hardware metadata list may be taken by the system to be safe or "trusted" components that have been authorized for use within the endpoint device.

The process continues to block 202, where the system continuously monitors components within the endpoint device based on the software metadata list and the hardware metadata list. In this regard, the system may automatically detect when hardware and/or software components within each endpoint device are added, modified, or removed. In this regard, the system may continuously query each endpoint device and receive a complete list of software and hardware currently installed on each endpoint device over the network. The system may then compare the new component against the software metadata list and/or hardware metadata list to determine whether the new component has been evaluated as being safe and/or authorized.

The process continues to block 203, where the system detects a new component within the endpoint device that does not appear in the software metadata list or the hardware metadata list. In some embodiments, the new component may be a new hardware device that has been installed or attached to the endpoint device (e.g., a previously unrecognized disk drive). In other embodiments, the new component may be a new application or library that has been installed onto the endpoint device. Upon detecting that the new component does not appear in the software metadata list and the hardware metadata list, the system may automatically flag the new component as requiring further analysis to determine the safety or security of the new component.

The process continues to block 204, where the system analyzes, using a machine learning algorithm, operational behavior of the new component. In particular, analyzing the operational behavior of the new component may comprise detecting the access permissions of the new component, detecting the operations executed by the new component, memory addresses accessed by the new component, files viewed and/or modified by the new component, monitoring the data sent and received by the endpoint device, and the like. By analyzing the operational behavior of the new component, the system may determine whether the new component is related to the operational objectives of the endpoint device and/or the applications installed thereon.

The process concludes at block 205, where the system, based on the operational behavior of the new component, determines a level of security of the new component. For instance, if the system detects that the new component is accessing restricted or confidential files stored on the endpoint device and that the new component is not involved in the operation of key devices or applications stored on the endpoint device, the system may determine that the new component is unsafe. Based on detecting that the security issue associated with the new component, the system may execute one or more remediation processes to remedy the security issue. Examples of the remediation processes may include network segmentation of the new component, deletion or isolation of the new component, secure wiping of the endpoint device, and the like. On the other hand, if the system detects that the new component is safe, the system may add the new component to the software metadata list or the hardware metadata list. In this way, the system may continuously ensure the security and safety of the endpoint devices as well as the applications and data stored therein.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention is not to be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for remediation of security vulnerabilities in computing devices using continuous device-level scanning and monitoring, the system comprising:
a memory device with computer-readable program code stored thereon;
a communication device; and
a processing device operatively coupled to the memory device and the communication device, wherein the processing device is configured to execute the computer-readable program code to:
generate a software metadata list and a hardware metadata list for an endpoint device within a network;
continuously monitor components within the endpoint device based on the software metadata list and the hardware metadata list;
detect a new component within the endpoint device that does not appear in the software metadata list or the hardware metadata list;
analyze, using a machine learning algorithm, operational behavior of the new component, wherein analyzing the operational behavior comprises using machine learning to determine whether the new component is related to operations of the endpoint device, wherein analyzing the operational behavior further comprises pausing operation of the new component while the new component is analyzed; and
based on the operational behavior of the new component, determine a level of security of the new component, wherein determining the level of security of the new component comprises, based on determining whether the new component is related to the operations of the endpoint device, determining whether the new component is authorized or unauthorized.

2. The system according to claim 1, wherein the processing device is further configured to execute the computer-readable program code to:
detect, based on the level of security of the new component, a security issue associated with the new component; and
initiate one or more remediation processes to address the security issue.

3. The system according to claim 2, wherein the one or more remediation processes comprises at least one of isolating the new component, deleting the new component, and performing network segmentation of the endpoint device.

4. The system according to claim 1, wherein the processing device is further configured to execute the computer-readable program code to:
detect, based on the level of security of the new component, that the new component is safe; and
add an entry for the new component in the software metadata list or the hardware metadata list.

5. The system according to claim 1, wherein the software metadata list comprises a list of authorized drivers, applications, and libraries associated with the endpoint device.

6. The system according to claim 1, wherein the hardware metadata list comprises a list of authorized processing units, storage devices, networking devices, and mainboards associated with the endpoint device.

7. The system according to claim 1, wherein analyzing the operational behavior of the new component comprises at least one of detecting access permissions, monitoring data sent and received by the new component, and detecting file access on the endpoint device.

8. A computer program product for remediation of security vulnerabilities in computing devices using continuous device-level scanning and monitoring, the computer program product comprising at least one non-transitory computer readable medium having computer-readable program code portions embodied therein, the computer-readable program code portions comprising executable portions for:
generating a software metadata list and a hardware metadata list for an endpoint device within a network;
continuously monitoring components within the endpoint device based on the software metadata list and the hardware metadata list;
detecting a new component within the endpoint device that does not appear in the software metadata list or the hardware metadata list;
analyzing, using a machine learning algorithm, operational behavior of the new component, wherein analyzing the operational behavior comprises using machine learning to determine whether the new component is related to operations of the endpoint device, wherein analyzing the operational behavior further comprises pausing operation of the new component while the new component is analyzed; and
based on the operational behavior of the new component, determining a level of security of the new component, wherein determining the level of security of the new component comprises, based on determining whether the new component is related to the operations of the endpoint device, determining whether the new component is authorized or unauthorized.

9. The computer program product of claim 8, wherein the computer-readable program code portions further comprise executable portions for:
detecting, based on the level of security of the new component, a security issue associated with the new component; and
initiating one or more remediation processes to address the security issue.

10. The computer program product of claim 9, wherein the one or more remediation processes comprises at least one of isolating the new component, deleting the new component, and performing network segmentation of the endpoint device.

11. The computer program product of claim 8, wherein the computer-readable program code portions further comprise executable portions for:
detecting, based on the level of security of the new component, that the new component is safe; and
adding an entry for the new component in the software metadata list or the hardware metadata list.

12. The computer program product of claim 8, wherein the software metadata list comprises a list of authorized drivers, applications, and libraries associated with the endpoint device.

13. The computer program product of claim 8, wherein the hardware metadata list comprises a list of authorized processing units, storage devices, networking devices, and mainboards associated with the endpoint device.

14. A computer-implemented method for remediation of security vulnerabilities in computing devices using continuous device-level scanning and monitoring, the computer-implemented method comprising:
- generating a software metadata list and a hardware metadata list for an endpoint device within a network;
- continuously monitoring components within the endpoint device based on the software metadata list and the hardware metadata list;
- detecting a new component within the endpoint device that does not appear in the software metadata list or the hardware metadata list;
- analyzing, using a machine learning algorithm, operational behavior of the new component, wherein analyzing the operational behavior comprises using machine learning to determine whether the new component is related to operations of the endpoint device, wherein analyzing the operational behavior further comprises pausing operation of the new component while the new component is analyzed; and
- based on the operational behavior of the new component, determining a level of security of the new component, wherein determining the level of security of the new component comprises, based on determining whether the new component is related to the operations of the endpoint device, determining whether the new component is authorized or unauthorized.

15. The computer-implemented method of claim 14, wherein the computer-implemented method further comprises:
- detecting, based on the level of security of the new component, a security issue associated with the new component; and
- initiating one or more remediation processes to address the security issue.

16. The computer-implemented method of claim 15, wherein the one or more remediation processes comprises at least one of isolating the new component, deleting the new component, and performing network segmentation of the endpoint device.

17. The computer-implemented method of claim 14, wherein the computer-implemented method further comprises:
- detecting, based on the level of security of the new component, that the new component is safe; and
- adding an entry for the new component in the software metadata list or the hardware metadata list.

18. The computer-implemented method of claim 14, wherein the software metadata list comprises a list of authorized drivers, applications, and libraries associated with the endpoint device.

19. The computer-implemented method of claim 14, wherein the hardware metadata list comprises a list of authorized processing units, storage devices, networking devices, and mainboards associated with the endpoint device.

20. The computer-implemented method of claim 14, wherein analyzing the operational behavior of the new component comprises at least one of detecting access permissions, monitoring data sent and received by the new component, and detecting file access on the endpoint device.

* * * * *